US009844074B2

(12) United States Patent
Johansson et al.

(10) Patent No.: US 9,844,074 B2
(45) Date of Patent: Dec. 12, 2017

(54) MAXIMIZING CHANNEL CAPACITY FOR COMMON DOWNLINK CHANNELS

(71) Applicant: TELEFONAKTIEBOLAGET L M ERICSSON (PUBL), Stockholm (SE)

(72) Inventors: Nicklas Johansson, Brokind (SE); Mårten Sundberg, Årsta (SE); Olof Liberg, Stockholm (SE); Sajal Kumar Das, Bangalore (IN); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 14/809,987

(22) Filed: Jul. 27, 2015

(65) Prior Publication Data
US 2016/0037540 A1 Feb. 4, 2016

Related U.S. Application Data

(60) Provisional application No. 62/050,517, filed on Sep. 15, 2014.

(30) Foreign Application Priority Data

Jul. 31, 2014 (IN) ............................ 2161/DEL/2014

(51) Int. Cl.
| | |
|---|---|
| *H04W 74/00* | (2009.01) |
| *H04L 1/00* | (2006.01) |
| *H04W 68/00* | (2009.01) |

(52) U.S. Cl.
CPC ............. *H04W 74/006* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS

| | | | | |
|---|---|---|---|---|
| 2003/0036403 | A1* | 2/2003 | Shiu ...................... | H04W 52/12 455/522 |
| 2004/0100911 | A1* | 5/2004 | Kwan ................... | H04L 1/0003 370/252 |

(Continued)

FOREIGN PATENT DOCUMENTS

EP 1 855 424 A1 11/2007

OTHER PUBLICATIONS

3GPP TS 45.010 V11.0.0 (Aug. 2012), 3rd Generation Partnership Project; Technical Specification Group GSM/EDGE Radio Access Network; Radio subsystem synchronization (Release 11), GP-55, Sep. 21, 2012, the whole document.

(Continued)

*Primary Examiner* — Steven H Nguyen

(57) ABSTRACT

A wireless access node and method are described herein for improving a bandwidth utilization efficiency of a common downlink (DL) channel when transmitting device-related information included in one or more messages to a wireless device or a group of wireless devices, wherein the one or more messages have one or more transport block formats that meet a coverage class need of the wireless device or the group of wireless devices. In addition, a wireless device and method are described herein for improving a bandwidth utilization efficiency of the common DL channel by receiving one or more messages including device-related information on the common DL channel from the wireless access node, wherein the one or more messages have one or more transport block formats that meet a coverage class need of the wireless device.

24 Claims, 5 Drawing Sheets

(52) U.S. Cl.
CPC .......... *H04L 1/0007* (2013.01); *H04L 1/0009* (2013.01); *H04W 68/005* (2013.01)

(56) References Cited

U.S. PATENT DOCUMENTS

| | | | | |
|---|---|---|---|---|
| 2005/0250540 A1* | 11/2005 | Ishii | ..................... | H04B 1/1027 455/561 |
| 2006/0089104 A1* | 4/2006 | Kaikkonen | ........... | H04W 72/08 455/67.13 |
| 2007/0060187 A1* | 3/2007 | Englund | ............. | H04W 52/143 455/522 |
| 2007/0177555 A1* | 8/2007 | Brueck | ................ | H04L 12/189 370/338 |
| 2008/0233989 A1* | 9/2008 | Kim | ...................... | H04L 1/0003 455/517 |
| 2009/0040970 A1* | 2/2009 | Ahmadi | ............... | H04B 7/2612 370/329 |
| 2009/0276674 A1* | 11/2009 | Wei | .......................... | H04L 1/16 714/749 |
| 2009/0323577 A1* | 12/2009 | Agrawal | ............... | H04L 1/0026 370/312 |
| 2010/0157927 A1* | 6/2010 | Mochizuki | ............ | H04L 1/1685 370/329 |
| 2010/0232297 A1* | 9/2010 | Johansson | ............. | H04L 1/0003 370/241 |
| 2010/0246429 A1* | 9/2010 | Hwang | ................. | H04H 20/42 370/252 |
| 2011/0103335 A1* | 5/2011 | Golitschek Edler von Elbwart | | H04L 1/0026 370/329 |
| 2011/0255584 A1* | 10/2011 | Dateki | .............. | H04W 72/0413 375/224 |
| 2012/0300739 A1* | 11/2012 | Froberg Olsson | .... | H04L 1/0006 370/329 |
| 2013/0039297 A1* | 2/2013 | Wang | .................. | H04W 76/045 370/329 |

OTHER PUBLICATIONS

Nokia et al: "D2D Communication without network coverage", 3GPP Draft; 3GPP TSG-RAN WG1 Meeting #74, R1-133495, Barcelona, Spain, Aug. 19-23, 2013. Section "3 D2D communication without network coverage"; "Table 1. Correspondence between cellular and D2D channels"; "Figure 2. Basic D2D communication without NW coverage", including the associated description; section "5 Groupcast communication"; "Figure 3. Groupcast communication according to alternative 2", including the associated description.

NSN et al: "Necessity on category 0 indication to network before UE capability delivery", 3GPP Draft, 3GPP TSG-RAN WG2 Meeting #86, R2-142474, Seoul, Korea, May 19-23, 2014. Section "2 Discussion", section "Observation 1", section "Observation 2", section "Observation 5", section "Observation 6".

* cited by examiner

MAXIMIZING CHANNEL CAPACITY FOR COMMON DOWNLINK CHANNELS

CLAIM OF PRIORITY

This application claims the benefit of priority to Indian Application No. 2161/DEL/2014, filed on Jul. 31, 2014, and to U.S. Provisional Application Ser. No. 62/050,517, filed on Sep. 15, 2014, the entire contents of each of which are hereby incorporated by reference for all purposes.

TECHNICAL FIELD

The present disclosure relates generally to common downlink channels in wireless communication networks and, more particularly, to techniques for increasing or maximizing channel capacity of a common downlink channel by utilizing different transport block formats in the common downlink channel to meet the coverage class needs of a specific wireless device or a group of wireless devices.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BCCH Broadcast Control Channel
BLER Block Error Rate
BS Base Station
CC Coverage Class
CCCH Common Control Channel
CN Core Network
CRC Cyclic Redundancy Check
CS Coding Scheme
DL Downlink
DRX Discontinuous Reception
DSP Digital Signal Processor
EDGE Enhanced Data rates for GSM Evolution
EGPRS Enhanced General Packet Radio Service
eNB evolved Node B
ETWS Earthquake and Tsunami Warning System
E-UTRA Evolved Universal Terrestrial Radio Access
GSM Global System for Mobile Communications
GERAN GSM/EDGE Radio Access Network
GMSK Gaussian Minimum Shift Keying
GPRS General Packet Radio Service
HARQ Hybrid Automatic Repeat Request
LTE Long-Term Evolution
MTC Machine Type Communications
MS Mobile Station
PCH Paging Channel
PDN Packet Data Network
PG Paging Group
P-TMSI Packet Temporary Mobile Station Identity
PTCCH/D Packet Timing Control Channel/Downlink
RAN Radio Access Node
RACH Random Access Channel
RLC Radio Link Control
TA Timing Advance
TDMA Time Division Multiple Access
TMSI Temporary Mobile Station Identity
UE User Equipment
Uplink
UMTS Universal Mobile Telecommunications System
WCDMA Wideband Code Division Multiple Access
WiMAX Worldwide Interoperability for Microwave Access In existing wireless communication networks, the communication between wireless devices and wireless access nodes in the network are typically handled by the use of different logical channels. Each logical channel has its own purpose(s) and is typically mapped onto a physical channel following a certain frame structure in time and frequency.

One type of logical channel on the downlink (DL) is one that is monitored by a multiplicity of wireless devices, and is also used for addressing a multiplicity (i.e., not necessarily all wireless devices monitoring the channel, but at least a subset) of wireless devices with a message sent by the wireless access node using a single radio block transmitted on the channel. This type of logical channel is referred to herein as a "common DL channel" and could include, for example, in Global System for Mobile (GSM), the Common Control Channel (CCCH).

In the existing wireless communication networks, the wireless access node typically uses the same transport block format (e.g., channel coding rate and error detection capability) for transmitting a message on a common DL channel irrespective of the type of wireless device or channel conditions applicable to any given wireless device. In particular, the wireless access node uses the same transport block format for each of the radio blocks used to send a message on the common DL channel, where the transport block format has a generic format that can be received by all of the wireless devices that are addressed by the message.

For example, one possible system implementation of the transport block format would be to have the wireless access node choose a channel coding rate that is sufficiently robust to ensure that all of the addressed wireless devices can correctly receive the corresponding transmitted radio block (message) with a certain minimum level of probability (i.e., regardless of the radio channel conditions experienced by any of the addressed wireless devices). In particular, to realize a sufficiently high probability of radio block (message) reception by all of the addressed wireless devices, the wireless access node may use a robust transmit block coding rate in combination with repeated transmissions of that transport radio block (message).

However, the wireless access node's configuration of the transport block format according to a worst case scenario regarding the channel conditions (for example) would typically result in a waste of radio resources. This waste of radio resources could, for example, occur when the wireless access node makes repeated transmissions (i.e., multiple repetitions) of a message on a common DL channel according to the number of repetitions that is needed by the wireless device with the worst radio channel conditions that is addressed by the message while many or all of the other wireless devices addressed by the same message may, for example, only need a single transmission. This waste of radio resources and other shortcomings are addressed in the present disclosure.

SUMMARY

A wireless access node, a wireless device, and various methods for addressing at least the aforementioned shortcoming and other shortcomings are described in the independent claims. Advantageous embodiments of the wireless access node, the wireless device, and the various methods are further described in the dependent claims.

In one aspect, the present disclosure provides a wireless access node configured to improve a bandwidth utilization efficiency on a common downlink (DL) channel when transmitting device-related information to a wireless device or a group of wireless devices. The wireless access node comprises a processor and a memory that stores processor-executable instructions, wherein the processor interfaces with the memory to execute the processor-executable instructions, whereby the wireless access node is operable to perform a determine operation. In the determine operation, the wireless access node determines one or more transport block formats to be utilized for transmitting the device-related information on the common DL channel to the wireless device or the group of wireless devices, wherein the one or more transport block formats meet a coverage class need of the wireless device or the group of wireless devices. The wireless access node, by determining one or more transport block formats to be utilized in this manner, has an advantage in that it helps to maximize the use of radio resources when transmitting device-related information on the common downlink DL channel to the wireless device or the group of wireless devices.

In another aspect, the present disclosure provides a method in a wireless access node for improving a bandwidth utilization efficiency on a common downlink (DL) channel when transmitting device-related information to a wireless device or a group of wireless devices. The method comprises a determining step. In the determining step, the wireless access node determines one or more transport block formats to be utilized for transmitting the device-related information on the common DL channel to the wireless device or the group of wireless devices, wherein the one or more transport block formats meet a coverage class need of the wireless device or the group of wireless devices. The method has an advantage in that it helps to maximize the use of radio resources when transmitting device-related information on the common downlink DL channel to the wireless device or the group of wireless devices.

In yet another aspect, the present disclosure provides a wireless device configured to improve a bandwidth utilization efficiency on a common downlink (DL) channel when receiving device-related information from a wireless access node. The wireless device comprises a processor and a memory that stores processor-executable instructions, wherein the processor interfaces with the memory to execute the processor-executable instructions, whereby the wireless device is operable to perform a receiving operation. In the receiving operation, the wireless device receives one or more messages including the device-related information on the common DL channel from the wireless access node, wherein the one or more messages have one or more transport block formats that meet a coverage class need of the wireless device. The wireless device, by adopting one or more transport block formats in this manner, has an advantage in that it helps to maximize the use of radio resources when receiving device-related information on the common downlink DL channel from the wireless access node.

In still yet another aspect, the present disclosure provides a method in a wireless device for improving a bandwidth utilization efficiency on a common downlink (DL) channel when receiving device-related information from a wireless access node. The method comprises a receiving step. In the receiving step, the wireless device receives one or more messages including the device-related information on the common DL channel from the wireless access node, wherein the one or more messages have one or more transport block formats that meet a coverage class need of the wireless device. The method has an advantage in that it helps to maximize the use of radio resources when receiving device-related information on the common downlink DL channel from the wireless access node.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
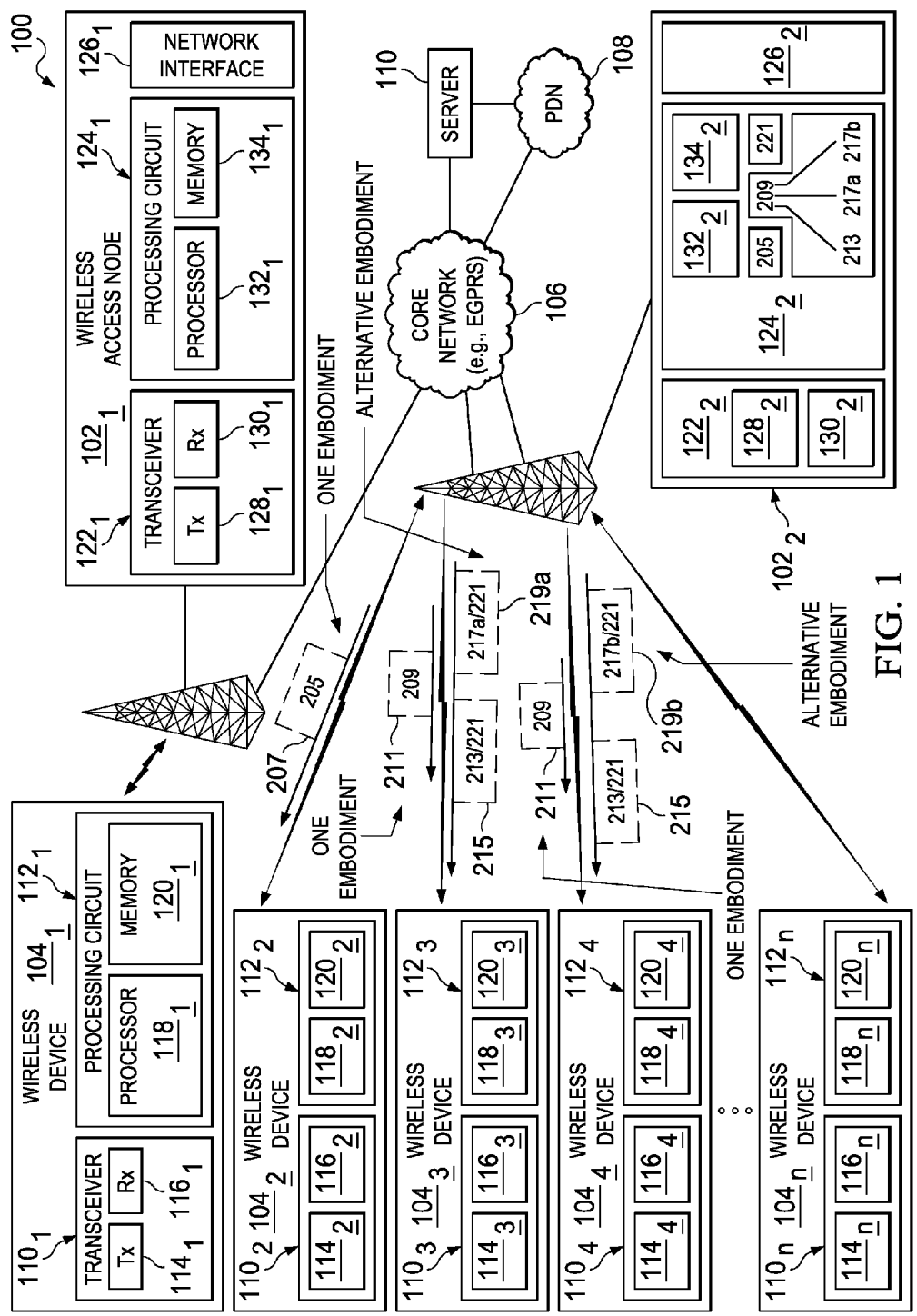
FIG. 1 is a diagram of an exemplary wireless communication network in accordance with an embodiment of the present disclosure.

To describe the technical features of the present disclosure, a discussion is provided first to describe an exemplary wireless communication network which includes multiple wireless access nodes and multiple wireless devices, each of which are configured in accordance with the present disclosure (illustrated in FIG. 1). Then, a discussion is provided to explain in more detail how the wireless access node and the wireless device each implement the technical features of the present disclosure (illustrated in FIGS. 2-5). Finally, a discussion is provided to explain the technical features of the present disclosure when applied to a GSM wireless communication network (illustrated in FIG. 6).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two shown), multiple wireless devices $104_1$, $104_2$, $104_3$, $104_4$ ... $104_n$, and a core network 106 (e.g., EGPRS core network 106). The wireless communication network 100 includes many other well-known components, but for clarity, only the components needed to describe the technical features of the present disclosure are described herein.

Further, the wireless communication network 100 is described herein as being an GSM/EGPRS wireless communication network 100 which is also known as an EDGE wireless communication network 100. However, those skilled in the art will readily appreciate that the techniques of the present disclosure, which are applied to the GSM/EGPRS wireless communication network 100, are generally applicable to other types of wireless communication systems, including, for example, WCDMA, LTE, and WiMAX systems.

The wireless communication network 100 includes the wireless access nodes $102_1$ and $102_2$ (only two shown) which provide network access to the wireless devices $104_1$, $104_2$, $104_3$, $104_4$ . . . $104_n$. In this example, the wireless access node $102_1$ is providing network access to wireless device $104_1$ while the wireless access node $102_2$ is providing network access to wireless devices $104_2$, $104_3$, $104_4$ . . . $104_n$. The wireless access nodes $102_1$ and $102_2$ are connected to the core network 106 (e.g., EGPRS core network 106). The core network 106 is connected to an external packet data network (PDN) 108, such as the Internet, and a server 110 (only one shown). The wireless devices $104_1$, $104_2$, $104_3$, $104_4$ . . . $104_n$ may communicate with one or more servers 110 (only one shown) connected to the core network 106 or the PDN 108.

The wireless devices $104_1$, $104_2$, $104_3$, $104_4$ . . . $104_n$ may refer generally to an end terminal (user) that attaches to the wireless communication network 100, and may refer to either a MTC device or a non-MTC device. Further, the term "wireless device" is generally intended to be synonymous with the term "User Equipment," or UE, as that term is used by the 3rd-Generation Partnership Project (3GPP), and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, the wireless access nodes $102_1$ and $102_2$ may refer in general to a base station or central node in the wireless communication network 100, and may refer to wireless access nodes $102_1$ and $102_2$ that are controlled by a physically distinct radio network controller as well as to more autonomous access points, such as the so-called evolved Node Bs (eNBs or eNodeBs) in Long-Term Evolution (LTE) networks. Accordingly, the term "wireless access node" may also refer to Radio Network Controllers (RNCs) and Node Bs (NBs) in 3G, or Base Station Controllers (BSCs) or Base Transceiver Stations (BTSs) in 2G.

Each wireless device $104_1$, $104_2$, $104_3$, $104_4$ . . . $104_n$ may include a transceiver circuit $110_1$, $110_2$, $110_3$, $110_4$ . . . $110_n$ for communicating with the wireless access nodes $102_1$ and $102_2$, and a processing circuit $112_1$, $112_2$, $112_3$, $112_4$ . . . $112_n$ for processing signals transmitted from and received by the transceiver circuit $110_1$, $110_2$, $110_3$, $110_4$ . . . $110_n$ and for controlling the operation of the corresponding wireless device $104_1$, $104_2$, $104_3$, $104_4$ . . . $104_n$. The transceiver circuit $110_1$, $110_2$, $110_3$, $110_4$ . . . $110_n$ may include a transmitter $114_1$, $114_2$, $114_3$, $114_4$ . . . $114_n$ and a receiver $116_1$, $116_2$, $116_3$, $116_4$ . . . $116_n$, which may operate according to any standard, e.g., the GSM/EDGE standard. The processing circuit $112_1$, $112_2$, $112_3$, $112_4$ . . . $112_n$ may include a processor $118_1$, $118_2$, $118_3$, $118_4$ . . . $118_n$ and a memory $120_1$, $120_2$, $120_3$, $120_4$ . . . $120_n$ for storing program code for controlling the operation of the corresponding wireless device $104_1$, $104_2$, $104_3$, $104_4$ . . . $104_n$. The program code may include code for performing the procedures (e.g., identifying a transport block format of multiple transport block formats included in a common downlink channel; determining values for properties of a transport block format; receiving information common to multiple wireless devices; receiving device-specific information; and identifying, from a transport block format, information allowing unique identification of common information corresponding to device-specific information) as described hereinafter.

Each wireless access node $102_1$ and $102_2$ may include a transceiver circuit $122_1$ and $122_2$ for communicating with wireless devices $104_1$, $104_2$, $104_3$, $104_4$ . . . $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106 (e.g., via core network nodes such as Serving GPRS Support Nodes (SGSNs) in GPRS or Mobility Management Entity (MMES) in LTE). The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures (e.g., determining coverage class for one or more wireless devices; determining respective values for properties of different transport block formats; determining different transport block formats for including in a common downlink channel; formatting a common downlink channel to include different transport block formats; identifying/extracting/sending information common to multiple wireless devices; identifying/extracting/sending wireless device-specific information; adding to or formatting transport block formats to include information that allows each of multiple wireless devices to uniquely identify which common information corresponds to its device-specific information; and determining a number of repetitions for transmitting information to a particular wireless device or group of wireless devices) as described hereinafter.

Technical Features of Present Disclosure

In the present disclosure, a scenario of interest is where N wireless devices $104_2$, $104_3$, $104_4$ (for example) are performing procedures during which they are attempting to read information (e.g., messages) on the DL of a common DL channel within the same time interval. It is proposed herein for the wireless access node $102_2$ (for example) to determine and utilize/adopt different transport block formats in a common DL control channel to meet the coverage class need of each specific user (e.g., wireless device $104_2$) or a group of users (e.g., wireless devices $104_3$ and $104_4$ with the same coverage class) attempting to read messages on the common DL control channel utilizing the determined different transport block formats, thereby improving bandwidth utilization efficiency on the common DL control channel when compared to the case where the wireless access node simply assumes the wireless devices are in the worst coverage class when utilizing/adopting transport block formats.

The term "transport block format" used herein refers to the way in which device-related information (e.g., messages) in the common DL channel is transmitted including, but not limited to:

the number of payload bits (i.e., message information bits) per transport block;
transport block modulation type;

transport block coding rate, which affects the number of payload bits per transport block;

time duration of the transport block (i.e., time interval spanned by the transmitted block); and if repetitions are used to achieve a lower transport block coding rate (i.e., allowing more payload bits per transport block), the number of transport block repetitions of a pre-defined format.

The term "coverage class" as used herein can be defined as follows: The coverage class of any given wireless device is essentially a measure of its current radio environment such that a wireless device in the worst coverage class supported by the network will need to make use of the most robust transport block format to help ensure that the wireless device remains operational. Conversely, wireless devices in the best coverage class will remain operational when the least robust transport block format is used. Additional transport block formats can be used for wireless devices that experience radio conditions worse than those of wireless devices in the best coverage class. At any point in time a wireless device belongs to a specific coverage class which determines the total number of blind transmissions to be used when receiving radio blocks. A coverage class applicable at any point in time can differ between different logical channels. Upon initiating a system access, a wireless access node determines the coverage class applicable to the RACH/AGCH based on estimating the number of blind repetitions of a radio block needed by the wireless device's receiver to experience a BLER (block error rate) of approximately 10%. The wireless access node determines the coverage class to be used by a wireless device on its assigned packet channel resources based on estimating the number of blind repetitions of a radio block needed to satisfy a target BLER and considering the number of HARQ retransmissions (of a radio block) that will, on average, result from using that target BLER.

Furthermore, in accordance with an alternative technical feature of the present disclosure, if a message normally sent on the common DL channel includes information common to a multiplicity of the wireless devices $104_3$ and $104_4$ (for example) monitoring that channel and addressed by that same message, it is proposed that the following alternative approach can be used by the wireless access node $102_2$ (for example) for delivering the message content to the group of wireless devices $104_3$ and $104_4$ (for example):

extract the common information 213 that is applicable to the group of wireless devices $104_3$ and $104_4$ (for example) from the device-related information 209 and transmit the common information 213 included in a message 215 using a transport block format that all of the addressed wireless devices $104_3$ and $104_4$ (for example) can decode;

extract the device-specific information $217a$ and $217b$ from the device-related information 209 and transmit the device-specific information $217a$ and $217b$ included in messages $219a$ and $219b$ respectively using a transport block format applicable to that respective wireless device $104_3$ or $104_4$ (for example) alone; and include information 221 in each transport block (message $219a$ and $219b$) including the device-specific information $217a$ and $217b$ and in the transport block(s) (messages(s) 215) including the common information 213 that allows each wireless device $104_3$ and $104_4$ (for example) to uniquely identify the transport block(s) (message(s) 215) including the common information 213 that corresponds to the transport block (message $219a$ and $219b$) including its device-specific information.

Using this alternative technical feature of sending information to N wireless devices $104_3$ and $104_4$ (for example) on a common DL channel allows for the use of fewer radio resources when compared to what would be required without such a separation of device-related information.

The following are some advantages associated with using the first technical feature (one embodiment) and the alternative technical feature (alternative embodiment) of the present disclosure:

Efficient usage of common DL channel in the wireless communication network 100.

Increased number of wireless devices addressable by the same common DL channel per unit of time.

Ensuring a Block Error Rate (BLER) performance similar to that of a legacy coding scheme CS-1 coded radio block for information received using the new transport block formats.

Improved wireless device power saving when receiving information addressed to the wireless device on the common DL channel.

The technical features of the present disclosure help to exploit these advantages in various ways, as described in the following examples:

(a) Optimum resource utilization: as each instance of information transmission consumes some available radio resources (e.g., time slot and frequency), transmitting the needed information using more radio resources than necessary is a waste of these scarce radio resources. As such, transmitting the needed information using device-appropriate transport blocks (messages) per the present disclosure is a preferred way of information transmission. This can be realized, for example, by introducing transport blocks (messages) that have a reduced number of information (i.e., payload) bits per burst compared to legacy operation, wherein for legacy operation the number of information bits per burst is determined based on the assumption that multiple instances of these bursts will be repeated and potentially include information addressing multiple devices. If transport blocks (messages) are instead realized using a single burst (which may be sufficient for cases where a small volume of payload information needs to be sent to a given wireless device) with the intent of the information carried therein only addressing a single wireless device, then better common DL control channel resource usage and capacity improvement becomes possible. This will be especially true for systems where transport block (message) repetitions will range from a single repetition for wireless devices in the best coverage class to X repetitions (e.g., 16) for wireless devices in the worst coverage class.

(b) Wireless device power saving: the disclosed techniques provide a clear advantage of wireless device power saving. For receiving a transport block in GSM, which is referred to as a radio block and transmitted over four bursts (spread over four Time Division Multiple Access (TDMA) frames, each consisting of eight timeslots), a wireless device will typically consume: $V_{cc}*I_{avg}*T=(3.3 \text{ V})*(50,000 \text{ μA})*(4*577 \text{ μs})+(3.3 \text{ V})*(1000 \text{ μA})*(28*577 \text{ μs})=434.13 \text{ μJ}$. Whereas, for receiving a transport block that is transmitted over a single burst, a wireless device will typically consume: $V_{cc}*I_{avg}*T=(3.3 \text{ V})*(50,000 \text{ μA})*(1*577 \text{ μs})=95.2 \text{ μJ}$. Thus, the power saving ratio per transport block will be approximately 4:1.

The term "radio block" is used herein and can be defined as follows: a message is sent using one or more radio blocks where each radio block may be transmitted using multiple repetitions at the physical layer (e.g., a legacy RLC data block is a radio block sent using four bursts). One or more radio blocks are used to send a message where each radio block in the set makes use of the same transport block format (e.g. same modulation scheme, same channel coding scheme, and the same number of repetitions per radio block). The radio resources are shared but are typically used to send a message to one wireless device at a time by including unique information in each radio block header to indicate the intended wireless device. However, the concept of group messaging also exists where information in each radio block header indicates the group of wireless devices for which the message is intended. The case where several messages (each message sent using a set of one or more radio blocks) are addressed to different wireless devices using the group messaging concept is possible but is not very typical, i.e., the more typical concept involves sending a single message to a single wireless device or to a group of wireless devices using a corresponding set of radio blocks.

Figure 2:
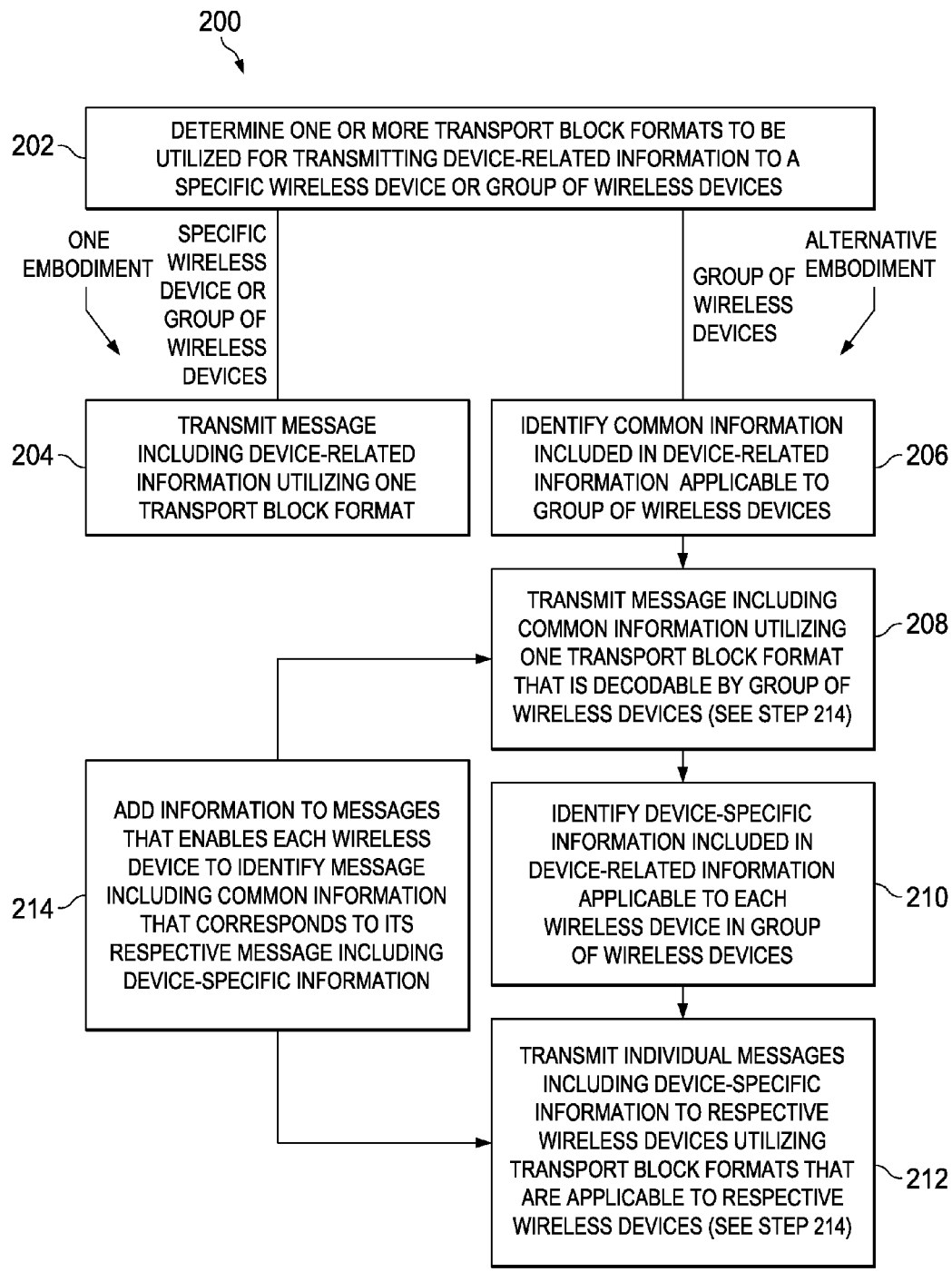
FIG. 2 is a flowchart of a method implemented in a wireless access node to improve a bandwidth utilization efficiency on a common DL channel when transmitting device-related information to a wireless device or a group of wireless devices in accordance with an embodiment of the present disclosure.

Referring to FIG. 2, there is a flowchart of a method 200 implemented in a wireless access node $102_2$ (for example) for improving a bandwidth utilization efficiency on a common DL channel when transmitting device-related information to a wireless device $104_2$ (for example) or a group of wireless devices $104_3$ and $104_4$ (for example) in accordance with an embodiment of the present disclosure. At step 202, the wireless access node $102_2$ determines one or more transport block formats to be utilized for transmitting the device-related information on the common DL channel to the wireless device $104_2$ or the group of wireless devices $104_3$ and $104_4$, wherein the one or more transport block formats meet a coverage class need of the wireless device $104_2$ or the group of wireless devices $104_3$ and $104_4$ (e.g., the wireless devices $104_3$ and $104_4$ have the same coverage class).

In one embodiment, the wireless access node $102_2$ has device-related information 205 for the wireless device $104_2$. In this case, the wireless access node $102_2$ at step 204 transmits a message 207 including the device-related information 205 to the wireless device $104_2$ utilizing one of the one or more transport block formats specifically determined based at least in part on the coverage class need of the wireless device $104_2$ (illustrated in FIG. 1). As an example, if the wireless device $104_2$ has a coverage class of "1" then the wireless access node $102_2$ would determine a transport block format to be utilized specifically for the wireless device $104_2$ that has a specific number of payload bits, modulation type, coding rate, time duration etc. and no repetitions based at least in part on the coverage class "1" (e.g., the coverage class "1" corresponds to an initial transmission and no repetitions). The wireless access node $102_2$ then transmits the message 207 including the device-related information 205 to the wireless device $104_2$ utilizing the determined transport block format (illustrated in FIG. 1).

In the same embodiment, the wireless access node $102_2$ has device-related information 209 for the group of wireless devices $104_3$ and $104_4$. In this case, the wireless access node $102_2$ at step 204 transmits a message 211 including the device-related information 209 to the group of wireless devices $104_3$ and $104_4$ utilizing one of the one or more transport block formats specifically determined based at least in part on the coverage class need of the group of wireless devices $104_3$ and $104_4$ (illustrated in FIG. 1). As an example, if the group of wireless devices $104_3$ and $104_4$ have a coverage class of "2" then the wireless access node $102_2$ would determine a transport block format to be utilized specifically for the group of wireless devices $104_3$ and $104_4$ that has a specific number of payload bits, modulation type, coding rate, time duration etc. . . . and one repetition based at least in part on the coverage class "2" (e.g., the coverage class "2" corresponds to an initial transmission and one repetition). The wireless access node $102_2$ then transmits the message 211 including the device-related information 209 to the group of wireless devices $104_3$ and $104_4$ utilizing the determined transport block format (illustrated in FIG. 1).

In an alternative embodiment, the wireless access node $102_2$ has device-related information 209 for the group of wireless devices $104_3$ and $104_4$, and the wireless access node $102_2$ instead of performing step 204 could perform steps 206, 208, 210, 212 and 214. More specifically, in this alternative embodiment, the wireless access node $102_2$ at step 202 determines a plurality of transport block formats to be utilized for transmitting the device-related information 209 on the common DL channel to the group of wireless devices $104_3$ and $104_4$. The wireless access node $102_2$ at step 206 would identify common information 213 included in the device-related information 209 applicable to the group of wireless devices $104_3$ and $104_4$, and transmit at step 208 a message 215 including the common information 213 to the group of wireless devices $104_3$ and $104_4$ utilizing one of the plurality of transport block formats that is decodable by the group of wireless devices $104_3$ and $104_4$ (illustrated in FIG. 1). Further, the wireless access node $102_2$ would identify at step 210 device-specific information 217a and 217b included in the device-related information 209 applicable to each individual wireless device $104_3$ and $104_4$ in the group of wireless devices $104_3$ and $104_4$, and transmit at step 212 individual messages 219a and 219b including the device-specific information 217a and 217b to the respective individual wireless devices $104_3$ and $104_4$ utilizing more than one of the plurality of transport block formats that are applicable to the respective individual wireless devices $104_3$ and $104_4$ (illustrated in FIG. 1). It is to be noted that the transport block format utilized to transmit the message 215 including the common information 213 to the group of wireless devices $104_3$ and $104_4$ can be the same as or different from at least one of the transport block formats utilized to transmit the individual messages 219a and 219b including the device-specific information 217a and 217b to the respective individual wireless devices $104_3$ and $104_4$. If desired, the wireless access node $102_2$ at step 214 can add information 221 in the message 215 including the common information 213 and in each of the individual messages 219a and 219b including the device-specific information 217a and 217b that enables each of the individual wireless devices $104_3$ and $104_4$ to uniquely identify the message 215 including the common information 213 that corresponds to its respective individual message 219a and 219b including the device-specific information 217a and 217b.

As an example, if the wireless devices $104_3$ and $104_4$ each have a coverage class of "2" then the wireless access node $102_2$ would determine a transport block format to be utilized specifically for the wireless devices $104_3$ and $104_4$ that has a specific number of payload bits for the common information 213, modulation type, coding rate, time duration etc. . . . and one repetition based at least in part on the coverage class "2" (e.g., the coverage class "2" corresponds to an initial transmission and one repetition). In addition, the wireless access node $102_2$ would determine a transport block format to be utilized specifically for the wireless device $104_3$ that has a specific number of payload bits for the device-specific information 217a, modulation type, coding rate, time duration etc. . . . and one repetition based at least in part on the coverage class "2". Plus, the wireless access node $102_2$ would determine a transport block format to be utilized specifically for the wireless device $104_4$ that has a specific number of payload bits for the device-specific information 217b, modulation type, coding rate, time duration etc. . . . and one repetition based at least in part on the coverage class "2". The wireless access node $102_2$ then transmits the message 215 including the common information 213 (possibly including the added information 221) to the wireless devices $104_3$ and $104_4$ utilizing the specially determined transport block format (illustrated in FIG. 1). Plus, the wireless access node $102_2$ would transmit the message 219a including the device-specific information 217a (possibly including the added information 221) to the wireless device $104_3$ utilizing the specially determined transport block format (illustrated in FIG. 1). It is to be noted that the transport block formats used to transmit the messages 215 and 219a can be the same or different. Finally, the wireless access node $102_2$ would transmit the message 219b including the device-specific information 217b (possibly including the added information 221) to the wireless device $104_4$ utilizing the specially determined transport block format (illustrated in FIG. 1). It is to be noted that the transport block formats used to transmit the messages 215 and 219b can be the same or different.

Figure 3:
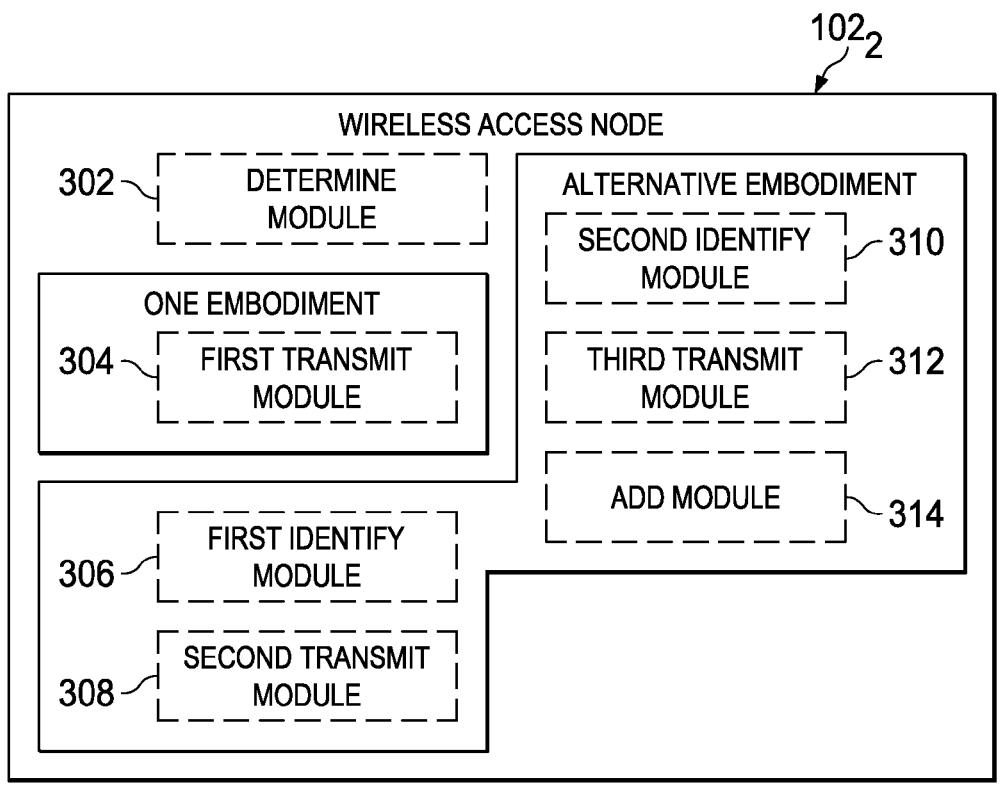
FIG. 3 is a block diagram illustrating structures of an exemplary wireless access node configured in accordance with an embodiment of the present disclosure.

Referring to FIG. 3, there is a block diagram illustrating structures of an exemplary wireless access node $102_2$ (for example) for improving a bandwidth utilization efficiency on a common DL channel when transmitting device-related information to a wireless device $104_2$ (for example) or a group of wireless devices $104_3$ and $104_4$ (for example) in accordance with an embodiment of the present disclosure. The wireless access node $102_2$ may comprise a determine module 302, a first transmit module 304, a first identify module 306, a second transmit module 308, a second identify module 310, a third transmit module 312, and an add module 314. The determine module 302 is configured to determine one or more transport block formats to be utilized for transmitting the device-related information on the common DL channel to the wireless device $104_2$ or the group of wireless devices $104_3$ and $104_4$, wherein the one or more transport block formats meet a coverage class need of the wireless device $104_2$ or the group of wireless devices $104_3$ and $104_4$. In one embodiment, if the wireless access node $102_2$ has device-related information 205 for the wireless device $104_2$, then the first transmit module 304 is configured to transmit a message 207 including the device-related information 205 to the wireless device $104_2$ utilizing one of the one or more transport block formats specifically determined based at least in part on the coverage class need of the wireless device $104_2$ (illustrated in FIG. 1). In the same embodiment, if the wireless access node $102_2$ has device-related information 209 for the group of wireless devices $104_3$ and $104_4$ (e.g., having the same coverage class), then the first transmit module 304 is configured to transmit a message 211 including the device-related information 209 to the group of wireless devices $104_3$ and $104_4$ utilizing one of the one or more transport block formats specifically determined based at least in part on the coverage class need of the group of wireless devices $104_3$ and $104_4$ (illustrated in FIG. 1).

The determine module 302 may determine a plurality of transport block formats to be utilized for transmitting the device-related information 209 on the common DL channel to the group of wireless devices $104_3$ and $104_4$. In an alternative embodiment, if the wireless access node $102_2$ has device-related information 209 for the group of wireless devices $104_3$ and $104_4$, then the first identify module 306 is configured to identify common information 213 included in the device-related information 209 for the group of wireless devices $104_3$ and $104_4$, and the second transmit module 308 is configured to transmit a message 215 including the common information 213 to the group of wireless devices $104_3$ and $104_4$ utilizing one of the plurality of transport block formats that is decodable by the group of wireless devices $104_3$ and $104_4$ (illustrated in FIG. 1). Further, the second identify module 310 is configured to identify device-specific information 217a and 217b included in the device-related information 209 applicable to each individual wireless device $104_3$ and $104_4$ in the group of wireless devices $104_3$ and $104_4$, and the third transmit module 312 is configured to transmit individual messages 219a and 219b including the device-specific information 217a and 217b to the respective individual wireless devices $104_3$ and $104_4$ utilizing more than one of the plurality of transport block formats that are applicable to the respective individual wireless devices $104_3$ and $104_4$ (illustrated in FIG. 1). It is to be noted that the transport block format utilized to transmit the message 215 including the common information 213 to the group of wireless devices $104_3$ and $104_4$ can be the same as or different from the transport block formats utilized to transmit the individual messages 219a and 219b including the device-specific information 217a and 217b to the respective individual wireless devices $104_3$ and $104_4$. The add module 314 is configured to add information 221 in the message 215 including the common information 213 and in each of the individual messages 219a and 219b including the device-specific information 217a and 217b that enables each of the individual wireless devices $104_3$ and $104_4$ to uniquely identify the message 215 including the common information 213 that corresponds to its respective individual message 219a and 219b including the device-specific information 217a and 217b.

As those skilled in the art will appreciate, the above-described modules 302, 304, 306, 308, 310, 312, and 314 of the wireless access node $102_2$ may be implemented separately as suitable dedicated circuits. Further, the modules 302, 304, 306, 308, 310, 312, and 314 can also be implemented using any number of dedicated circuits through functional combination or separation. In some embodiments, the modules 302, 304, 306, 308, 310, 312, and 314 may be even combined in a single application specific integrated circuit (ASIC). As an alternative software-based implementation, the wireless access node $102_2$ may comprise a memory $134_2$, a processor $132_2$ (including but not limited to a microprocessor, a microcontroller or a Digital Signal Processor (DSP), etc.) and a transmitter $128_2$. The memory $134_2$ stores machine-readable program code executable by the processor $132_2$ that cause the wireless access node $102_2$ to perform the steps of the above-described method 200. It is to be noted that the wireless access nodes $102_1$ and $102_2$ and other wireless access nodes can be configured to implement the above-described method 200.

Figure 4:
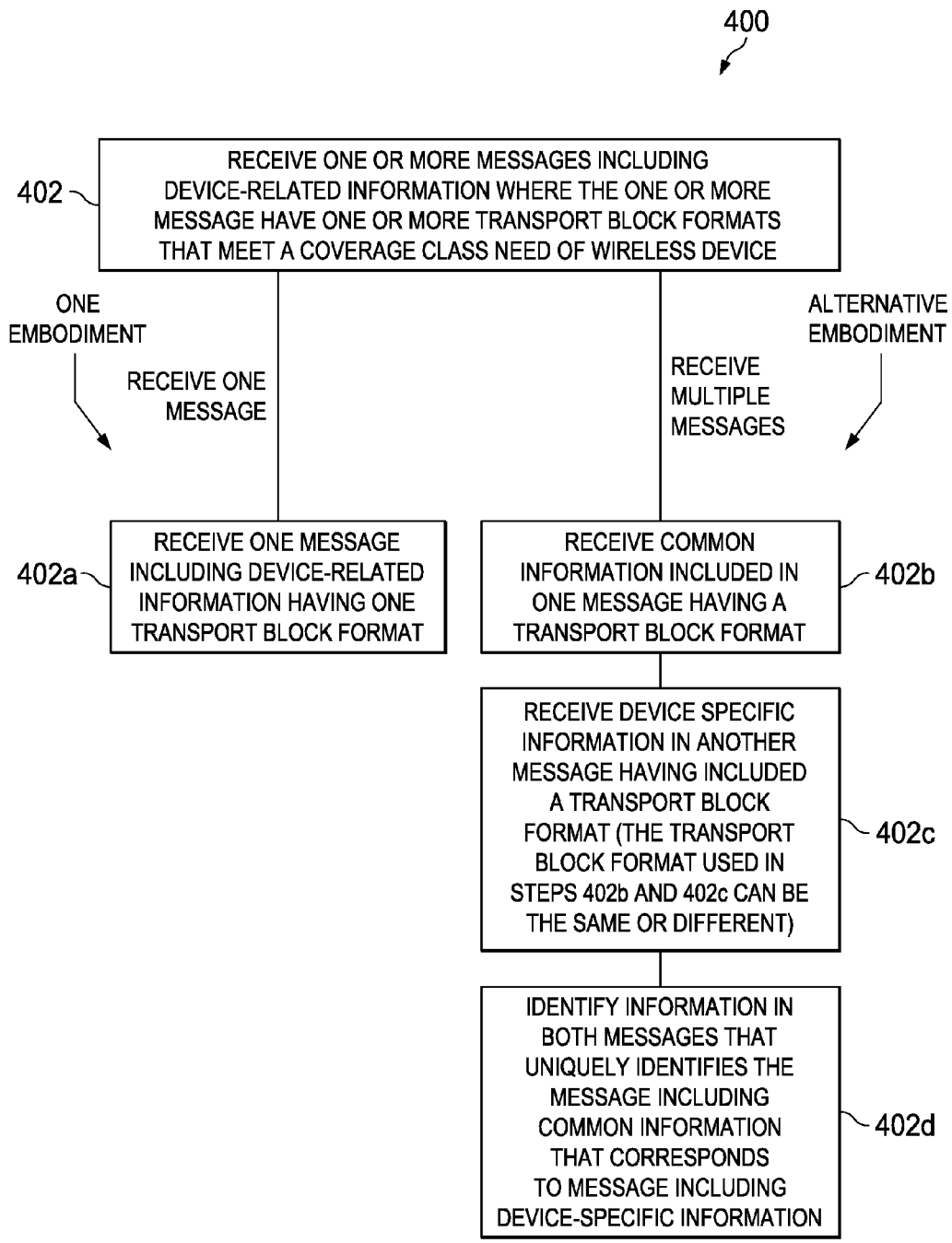
FIG. 4 is a flowchart of a method implemented in a wireless device to improve a bandwidth utilization efficiency on a common DL channel when receiving device-related information from a wireless access node in accordance with an embodiment of the present disclosure.

Referring to FIG. 4, there is a flowchart of a method 400 implemented in a wireless device $104_2$, $104_3$ or $104_4$ (for example) for improving a bandwidth utilization efficiency on a common DL channel when receiving device-related information from a wireless access node $102_2$ (for example) in accordance with an embodiment of the present disclosure. At step 402, the wireless device $104_2$, $104_3$ or $104_4$ receives one or more messages 207, 211, 215, 219a and 219b including the device-related information on the common DL channel from the wireless access node $102_2$, wherein the one or more messages 207, 211, 215, 219a and 219b have one or more transport block formats that meet a coverage class need of the wireless device $104_2$, $104_3$ or $104_4$. In one embodiment, the wireless device $104_2$ receives at step 402a the device-related information 205 included in message 207 having one transport block format based at least in part on the coverage class of the wireless device $104_2$. In the same embodiment, the wireless device $104_3$ receives at step 402a the device-related information 209 included in message 211 having one transport block format based at least in part on the coverage class of the wireless device $104_3$.

At step 402, the wireless device $104_2$, $104_3$ or $104_4$ may receive a plurality of messages including the device-related information, wherein the plurality of messages has a plurality of transport block formats. In an alternative embodiment, the wireless device $104_3$ receives at step 402b the common information 213 included in message 215 having one of the plurality of transport block formats based at least in part on the coverage class of the wireless device $104_3$. In addition, the wireless device $104_3$ receives at step 402c the device-specific information 217a included in message 219a having one of the plurality of transport block formats based at least in part on the coverage class of the wireless device $104_3$. It is to be noted that the transport block formats used for messages 215 and 219a can be the same or different. Plus, the wireless device $104_3$ at step 402d identifies information 221 in the message 215 including the common information 213 and the message 219a including the device-specific information 217a that enables the wireless device $104_3$ to uniquely identify the message 215 including the common information 213 that corresponds to the message 219a including the device-specific information 217a. In one embodiment, the wireless devices $104_4$ receives at step 402a the device-related information 209 included in message 211 having one transport block format based at least in part on the coverage class of the wireless device $104_4$. In an alternative embodiment, the wireless device $104_4$ receives at step 402b the common information 213 included in message 215 having one of the plurality of transport block formats based at least in part on the coverage class of the wireless device $104_4$. In addition, the wireless device $104_4$ receives at step 402c the device-specific information 217b included in message 219b having one of the plurality of transport block formats based at least in part on the coverage class of the wireless device $104_4$. It is to be noted that the transport block formats used for messages 215 and 219b can be the same or different. Plus, the wireless device $104_4$ at step 402d identifies information 221 in the message 215 including the common information 213 and the message 219b including the device-specific information 217b that enables the wireless device $104_4$ to uniquely identify the message 215 including the common information 213 that corresponds to the message 219b including the device-specific information 217b.

Figure 5:
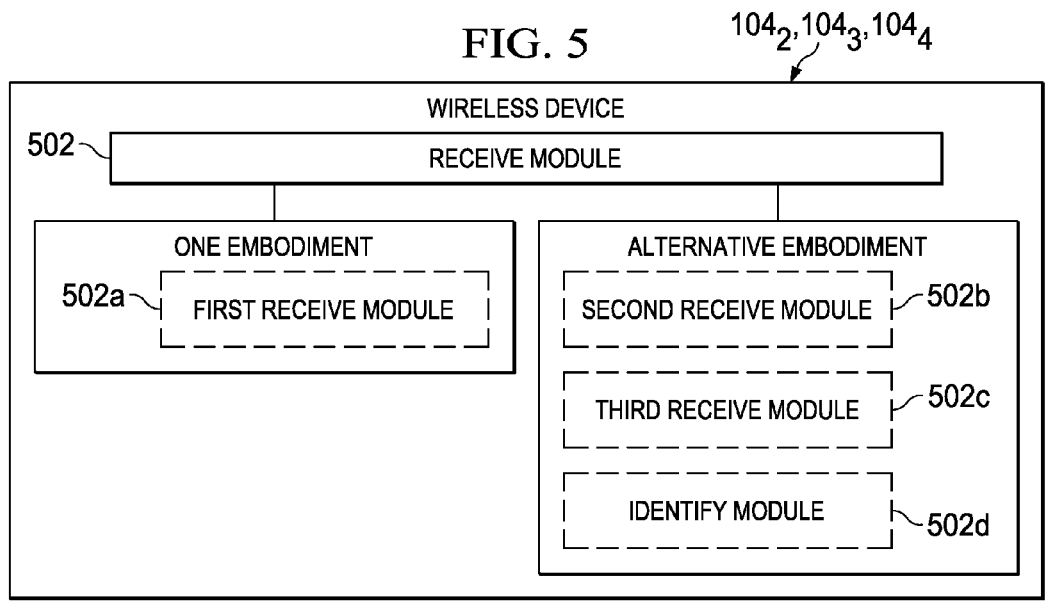
FIG. 5 is a block diagram illustrating structures of an exemplary wireless device configured in accordance with an embodiment of the present disclosure; and, FIG. 6 is a graph illustrating the simulation results of a performance of a four burst radio block carrying 184 information bits compared to a one burst radio block carrying different amounts of information bits.

Referring to FIG. 5, there is a block diagram illustrating structures of an exemplary wireless device $104_2$, $104_3$ or $104_4$ (for example) for improving a bandwidth utilization efficiency on a common DL channel when receiving device-related information from the wireless access node $102_2$ (for example) in accordance with an embodiment of the present disclosure. The wireless device $104_2$, $104_3$ or $104_4$ (for example) may comprise a receive module 502, a first receive module 502a, a second receive module 502b, a third receive module 502c, and an identify module 502d. The receive module 502 is configured to receive one or more messages 207, 211, 215, 219a and 219b including the device-related information on the common DL channel from the wireless access node $102_2$, wherein the one or more messages 207, 211, 215, 219a and 219b have one or more transport block formats that meet a coverage class need of the wireless device $104_2$, $104_3$ or $104_4$. In one embodiment, the wireless device $104_2$ comprises the first receive module 502a that is configured to receive the device-related information 205 included in message 207 having one transport block format based at least in part on the coverage class of the wireless device $104_2$. In one embodiment, the wireless device $104_3$ comprises the first receive module 502a that is configured to receive the device-related information 209 included in message 211 having one transport block format based at least in part on the coverage class of the wireless device $104_3$.

The receive module 502 may receive a plurality of messages including the device-related information, wherein the plurality of messages has a plurality of transport block formats. In an alternative embodiment, the wireless device $104_3$ comprises the second receive module 502b that is configured to receive the common information 213 included in message 215 having one of the plurality of transport block formats based at least in part on the coverage class of the wireless device $104_3$. In addition, the wireless device $104_3$ comprises the third receive module 502c that is configured to receive the device-specific information 217a included in message 219a having one of the plurality of transport block formats based at least in part on the coverage class of the wireless device $104_3$. It is to be noted that the transport block formats used for messages 215 and 219a can be the same or different. Plus, the wireless device $104_3$ comprises the identify module 502d that is configured to identify information 221 in the message 215 including the common information 213 and the message 219a including the device-specific information 217a that enables the wireless device $104_3$ to uniquely identify the message 215 including the common information 213 that corresponds to the message 219a including the device-specific information 217a.

In one embodiment, the wireless device $104_4$ comprises the first receive module 502a that is configured to receive the device-related information 209 included in message 211 having one transport block format based at least in part on the coverage class of the wireless device $104_3$. In an alternative embodiment, the wireless device $104_4$ comprises the second receive module 502b that is configured to receive the common information 213 included in message 215 having one of the plurality of transport block formats based at least in part on the coverage class of the wireless device $104_4$. In addition, the wireless device $104_4$ comprises the third receive module 502c that is configured to receive the device-specific information 217b included in message 219b having one of the plurality of transport block formats based at least in part on the coverage class of the wireless device $104_4$. It is to be noted that the transport block formats used for messages 215 and 219b can be the same or different. Plus, the wireless device $104_4$ comprises the identify module 502d that is configured to identify information 221 in the message 215 including the common information 213 and the message 219b including the device-specific information 217b that enables the wireless device $104_4$ to uniquely identify the message 215 including the common information 213 that corresponds to the message 219b including the device-specific information 217b.

As those skilled in the art will appreciate, the above-described modules 502, 502a, 502b, 502c and 502d of the wireless device $104_2$, $104_3$ or $104_4$ (for example) may be implemented separately as suitable dedicated circuits. Further, the modules 502, 502a, 502b, 502c and 502d can also be implemented using any number of dedicated circuits through functional combination or separation. In some embodiments, the modules 502, 502a, 502b, 502c and 502d may be even combined in a single application specific integrated circuit (ASIC). As an alternative software-based implementation, the wireless device $104_2$, $104_3$ or $104_4$ (for example) may comprise a memory $120_2$, $120_3$ and $120_4$, a processor $118_2$, $118_3$ and $118_4$ (including but not limited to a microprocessor, a microcontroller or a Digital Signal Processor (DSP), etc.) and receiver $116_2$, $116_3$ and $116_4$. The memory $120_2$, $120_3$ and $120_4$ stores machine-readable program code executable by the processor $118_2$, $118_3$ and $118_4$ that cause the wireless device $104_2$, $104_3$ or $104_4$ (for example) to perform the steps of the above-described method 400. It is to be noted that the wireless devices $104_1$, $104_2$, $104_3$, $104_4$ ... $104_n$ and other wireless devices can be configured to implement the above-described method 400.

Application to GSM Wireless Communication Network

1. Paging Channel (PCH)

In one embodiment, the above techniques are applied to the GSM wireless communication network and the PCH channel, part of the CCCH in the DL. The current PCH can at most carry paging-related information to four wireless devices addressed within a PCH message. The default transport block format used by GSM today for sending PCH messages is known as a radio block, containing 23 octets of payload space (mapped into 456 bits after cyclic redundancy check (CRC) addition and encoding). A radio block consists of four normal bursts, each occupying one timeslot in the TDMA frame structure in GSM. Furthermore, the transport block format consists of using Gaussian Minimum Shift Keying (GMSK) modulation and a code rate provided by coding scheme CS-1 to convey the information to the wireless devices.

In the following discussion, it is assumed that the changes to the legacy transport block format needed for the new transport block format proposed pursuant to the present disclosure involves:

1. Reduced time duration from a four burst radio block to as little as a single burst radio block.
2. Reduced payload information per transport block. Different mechanisms may be used to reduce the size of PCH messages. For example, the 'type of identity' in a paging message may be fixed to a Packet Temporary Mobile Station Identity (P-TMSI). As Temporary Mobile Station Identity (TMSI) is 32 bits only, only 32 bits will be needed in the Mobile Identity information element field (e.g., 'MS identity' in paging message) to address the MS using P-TMSI. Thus, using P-TMSI will help to reduce the total number of information bits that need to be carried within the transport block.
3. Allowing for a variable number of transport block repetitions to reflect the radio channel conditions specific to each of the N wireless devices to be paged. It is to be noted that it is possible to adapt the number of transport block repetitions dynamically, for example, according to device-specific radio channel quality (e.g., detected or based on ongoing device-specific feedback received) or according to a fixed coverage class associated with a given wireless device.

2. PCH Example

The following properties of the transport block format are assumed to be the same for this example as for the current (i.e., legacy) PCH:

1. Modulation used (i.e., GMSK)
2. Code rate used (i.e., around 1/2). It is assumed that a one burst radio block and a four burst radio block of roughly the same code rate provide roughly the same performance. This is supported by the simulation results illustrated in the graph shown in FIG. 6 where the performance of a four burst radio block carrying 184 information bits is compared to a one burst radio block carrying different amounts of information bits. The results where simulated over a slowly moving, non-hopping channel with a Doppler spread of around 1 Hz.

Further, it is assumed that the four users (wireless devices) multiplexed in the current PCH block need 1, 4, 8, and 2 repetitions, respectively, for user 1, 2, 3, and 4.

Hence, the current PCH consisting of 4 bursts per radio block transmitted needs to be transmitted 8 times to ensure the decoding (i.e., reception performance) of user 3 (i.e., the user with the worst radio channel conditions, in this example), and hence, in total 8*4=32 normal bursts need to be transmitted. If instead, the modulation and code rate above are followed, but within the context of the new device-specific transport block format techniques described in the present disclosure, then the same information could be carried with 1+4+8+2=15 bursts. Hence, a bandwidth reduction of 53% is achieved.

More detailed simulations have also been performed where the probability of a wireless device needing extended coverage (i.e., more than a single repetition) is assumed to be 20%, and within that 20%, the number of repetitions needed for different levels of extended coverage is:

10%: 2 transmissions
5%: 4 transmissions
3%: 8 transmissions
2%: 16 transmissions In the case of using the disclosed techniques proposed in the present disclosure, the average resource utilization is: (0.8*1 burst)+[(0.1*2 bursts)+(0.05*4 bursts)+(0.03*8 bursts)+(0.02*16 bursts)]=1.76 bursts. However, if assuming multiplexing of four users (wireless devices) in the same paging block as per current operation (i.e., the Broadcast Control Channel (BCCH) makes no attempt to address wireless devices of the same or similar coverage class within the same paging block), then the corresponding resource utilization, when using the current 4 burst PCH block, is 3.7 bursts. Even though users (wireless devices) needing 16 repetitions are rare in the system, these users will, when paired with three other users in the same block, most probably be paired with users needing only a single repetition. For those users needing only a single repetition, the number of repetitions used is a vast waste of radio resources. In this example, the bandwidth saving with the new transport block formats of the present disclosure is around 53%.

The use of the new transport block formats pursuant to the present disclosure will effectively generate a quadrupling of the number of paging groups associated with any given coverage class for any given Discontinuous Reception (DRX) cycle, since repetitions will be performed on the burst level instead of at the radio block level. For example, a wireless device needing eight repetitions and using a DRX cycle of approximately one minute will result in the following:

DRX cycle=256 51-multiframes~60 sec (208 DRX cycles within the overall frame number (FN) space).
PCH blocks (4 bursts each) per DRX cycle=PB_DRX_CYCLE=256*8=2048.
Paging groups per DRX cycle=PG_DRX_CYCLE= (PB_DRX_CYCLE*4)/8=1024.

No inherent difficulty is seen to arise from a paging group perspective when using the new burst based transport block format described herein.

3. Managing Common Information on the PCH

Figure 6:
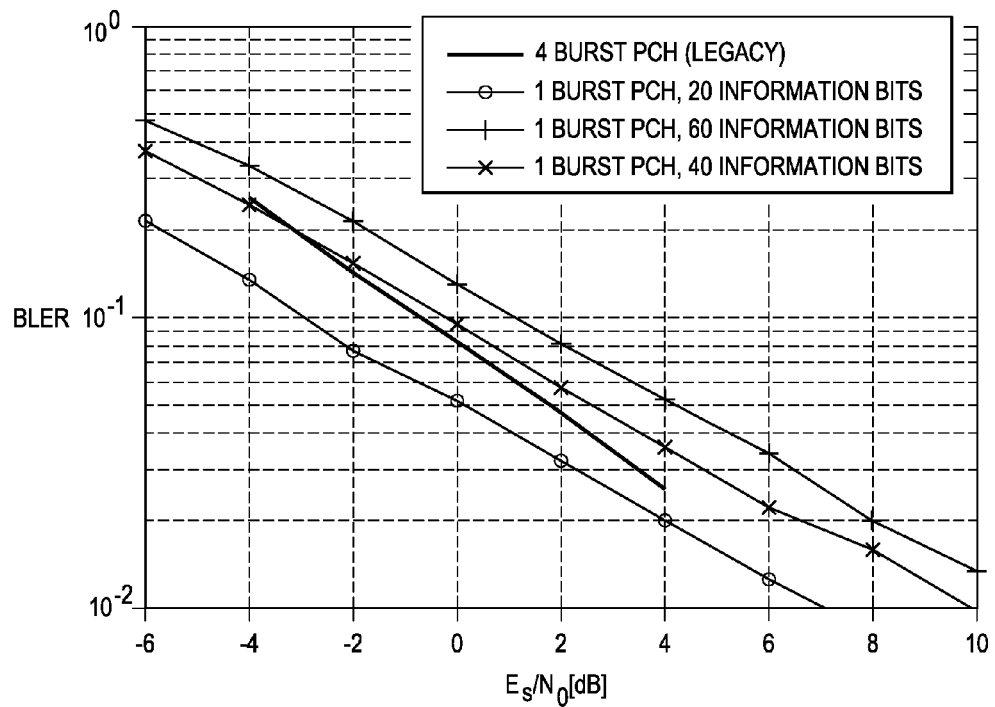

PCH messages currently contain information common to all wireless devices including the set of N wireless devices to be paged within that PCH message (e.g., implicit reject information and Earthquake and Tsunami Warning System (ETWS) information) as well as device-specific information (e.g., MS identification such as P-TMSI). If the common information is not sent separately from the device-specific information, then together their payload space could be large enough to need a reduced channel coding rate for the transport blocks used to send them, and thereby result in a reduced BLER performance for these transport blocks, as illustrated in FIG. 6. As such, from a transport block BLER perspective, it may be beneficial if the common information is sent using transport blocks separate from transport blocks used to send the N instances of device-specific information as described in the present disclosure. This can be realized, for example, using one or more of the technical features of the present disclosure as follows:

Identify the common information applicable to a set of N wireless devices that need to be paged and send the common information using a transport block format that all N devices can decode;

Send each of the N instances of device-specific information using an applicable transport block format. The device-specific information could also include, for example, a flag indicating whether or not the wireless device needs to still acquire common information, since the common information could be semi-static and therefore may not have changed since the last time the common information was read by the wireless device; and Include information in each of the transport block formats used to send the device-specific information and in the transport block format used to send the common information that enables each of the N wireless devices to uniquely identify which common information corresponds to its device-specific information.

Using the previous example where four users (wireless devices) are to be paged and respectively need 1, 4, 8, and 2 repetitions, there will be 15 transport blocks including device-specific information and 8 transport blocks including the common information, where all 23 transport blocks (bursts) maintain payload space specific transport block BLER performance, as illustrated in FIG. 6. This is still a large improvement (i.e., 28% fewer bursts needed) compared to the 32 bursts that would need to be transmitted using the legacy transport block format, wherein each PCH block consists of 4 bursts and is repeated 8 times.

3.1 Management of PCH Resources

In today's GSM wireless communication network, the base station (BS) needs to send valid layer 3 messages continuously on all paging sub-channels on the CCCH. However, when wireless devices of different coverage classes monitor the same physical resource for layer 3 messages, it might turn out that wireless device B of a device class experiencing better coverage than the corresponding class for wireless device A (i.e., implying, for example, that less repetitions are needed to reach the wireless device B) is sent a layer 3 message using one or more radio blocks that include radio block(s) of wireless device A's paging group. Although these paging messages will not include a layer 3 message addressing wireless device A, it is of interest for wireless device A to decode the radio block sent from the BS to get a confirmation that wireless device A is still connected to a suitable cell and that wireless device A is still monitoring a correct CCCH. However, wireless device A will not be able to correctly decode the radio block unless the radio block is transmitted using a sufficiently high number of repetitions.

3.2 Overload Control Management Using PCH Resources

In addition, wireless devices may still need to be subject to an overload control mechanism, e.g., the legacy Implicit Reject feature, in which the wireless devices first need to read a PCH/Access Grant Channel (AGCH) message (sent to any wireless device) to obtain access permission related information prior to attempting a system access.

When sending information on a CCCH, the network takes into account wireless devices associated with the highest coverage class (e.g., needing 16 repetitions) since these wireless devices may be monitoring the channel. This can be realized by ensuring a certain minimum periodicity with which this information (e.g., overload control, valid Layer 3 header) is sent using the transport formats needed by these wireless devices. For example, the network can periodically send Implicit Reject information as common information using a transport block format appropriate for 16 repetitions regardless of whether or not the network needs to send information to any specific high coverage class wireless device at that point in time.

4. Access Grant Channel (AGCH)

Support for new transport block formats used for sending messages on the AGCH per the present disclosure can be realized in the same manner as described above for PCH messages, since the same payload volume dependent BLER performance applies as illustrated in FIG. 6. One difference may be that the volume of common information associated with an AGCH message sent using legacy procedures can be expected to be significantly larger than for a PCH message. As such, for the AGCH case, there may be an even greater incentive for sending common information (i.e., information applicable to a set of N wireless devices looking for an AGCH message) using a transport block format that all N wireless devices can decode per the present disclosure.

5. Packet Timing Control Channel/Downlink (PTCCH/D)

In one embodiment, the above techniques of the present disclosure can be applied to the PTCCH/D channel, which is used to support the Continuous Timing Advance (TA) procedure in GSM for all wireless devices (MSs) in packet transfer mode, as described in 3GPP TS 45.010 V11.0.0, entitled "Technical Specification Group GSM/EDGE Radio Access Network; Radio subsystem synchronization (Release 11)." The contents of this document are hereby incorporated by reference.

The PTCCH/D can at most carry eight bits of TA related information to 16 wireless devices (users) addressed by the same radio block. The default transport block format used by GSM today is to transmit the PTCCH/D over a radio block consisting of four normal bursts, each occupying one timeslot distributed evenly over two 52-multi-frames. The transport block format consists of using GMSK modulation and a code rate provided by coding scheme CS-1 to convey the information to the wireless device's receiver.

However, per the present disclosure, the transmit time duration of the PTCCH/D is reduced from a four burst radio block to a single burst radio block. In the single burst format, at least four wireless devices (users) using eight bits of TA information can be addressed. Over four bursts, the numbers of addressed wireless devices (users) are at least 16, as today.

In another embodiment of the present disclosure, up to six users using eight bits of TA information can be supported per burst, with the same code rate as today (i.e., as defined by coding scheme CS-1). The simulation results illustrated in FIG. 6 for the PCH are applicable also to the PTCCH/D.

In another embodiment of the present disclosure, where less than eight bits of TA information are transmitted per wireless device (user), the code rate can be made more robust than coding scheme CS-1 to improve link level performance, and/or to lower the number of repetitions needed in an extended coverage scenario. Alternatively, the number of wireless devices (users) supported by a single burst can be extended beyond six.

In yet another embodiment of the present disclosure, the number of repetitions for the single burst format used in an extended coverage scenario is adapted, e.g., according to the need of the wireless devices (users) addressed in the single burst format. Groupings of wireless devices (users) with similar or the same coverage class needs will minimize the total number of burst transmissions in the Continuous TA procedure.

In contrast to the PTCCH/D block multiplexing scheme used today, where each wireless device assigned the same physical channel (i.e., where the PTCCH/D is mapped) monitors each PTCCH/D block on that channel, the PTCCH/D channel when mixing wireless devices (users) of different coverage classes will have to be assigned such that wireless devices know or can determine which radio resources are applicable and with which periodicity the radio resources should be read.

An alternative approach to realizing PTCCH/D for extended coverage in accordance with the present disclosure is to provide an update interval of the TA information, for example, according to the worst coverage class wireless devices. In one example, the worst coverage class needs 16 repetitions. In this case, each PTCCH block (addressing all wireless devices as per current operation) may only change TA information every 16th PTCCH/D block interval.

SUMMARY

A scenario addressed by the present disclosure is where N wireless devices are performing procedures during which the N wireless devices are attempting to read information (e.g., messages) on the DL of a common channel within the same time interval and the network introduces new transport block formats in the DL of a common channel to send the N wireless devices information (e.g., messages) in a way that satisfies the specific coverage class needs of these N wireless devices and that will result in the ability to realize a significantly improved utilization of the bandwidth available on the common DL channel when compared to the case where the wireless devices are simply assumed to be in the worst coverage class. In addition, another scenario discussed herein considers the case where information that is common to all N wireless devices is identified and sent using transport blocks that are separate from transport blocks used to send device-specific information, thereby allowing the use of fewer radio resources when compared to what would be required without such separation of information. Finally, an improved power saving for wireless devices reading the common channel can be realized since the use of these new transport formats results in fewer bursts being read and processed, especially for the wireless devices in the best coverage class (e.g., coverage class 1 wherein only a single initial transmission/reception is needed).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless access node configured to improve a bandwidth utilization efficiency on a common downlink (DL) channel when transmitting device-related information to a wireless device or a group of wireless devices, the wireless access node comprising:
   a processor; and,
   a memory that stores processor-executable instructions, wherein the processor interfaces with the memory to execute the processor-executable instructions, whereby the wireless access node is operable to:
   determine one or more transport block formats to be utilized for transmitting the device-related information on the common DL channel to the wireless device or the group of wireless devices, wherein the one or more transport block formats require a number of repeated transmissions of the device-related information on the common DL channel to meet a current coverage class of the wireless device or a coverage class common to the group of wireless devices; and,
   determine the current coverage class to be used by the wireless device based on estimating the number of repeated transmissions to satisfy a target Block Error Rate (BLER) and considering a number of Hybrid Automatic Repeat Request (HARQ) retransmissions that will on average result from satisfying the target BLER.

2. The wireless access node of claim 1, wherein the wireless access node is further operable to:
transmit a message including the device-related information to the wireless device or the group of wireless devices utilizing one of the one or more transport block formats.

3. The wireless access node of claim 1, wherein a plurality of transport block formats is determined to be utilized for transmitting the device-related information on the common DL channel to the group of wireless devices, and wherein the wireless access node is further operable to:
identify common information included in the device-related information applicable to the group of wireless devices, and transmit a message including the common information to the group of wireless devices utilizing one of the plurality of transport block formats that is decodable by the group of wireless devices; and,
identify device-specific information included in the device-related information applicable to each individual wireless device in the group of wireless devices, and transmit individual messages including the device-specific information to the respective individual wireless devices utilizing more than one of the plurality of transport block formats that are applicable to the respective individual wireless devices.

4. The wireless access node of claim 3, wherein the one of the plurality of transport block formats utilized to transmit the message including the common information to the group of wireless devices is the same as at least one of the more than one of the plurality of transport block formats utilized to transmit the individual messages including the device-specific information to the respective individual wireless devices.

5. The wireless access node of claim 3, wherein the wireless access node, before transmitting the message including the common information and before transmitting the individual messages including the device-specific information, is further operable to:
add information in the message including the common information and in each of the individual messages including the device-specific information, wherein the added information enables each of the individual wireless devices to uniquely identify the message including the common information that corresponds to its respective individual message including the device-specific information.

6. The wireless access node of claim 1, wherein the current coverage class of the wireless device or the coverage class common to the group of wireless devices determines the number of repeated transmissions of the device-related information on the common DL channel.

7. A method in a wireless access node for improving a bandwidth utilization efficiency on a common downlink (DL) channel when transmitting device-related information to a wireless device or a group of wireless devices, the method comprising:
determining one or more transport block formats to be utilized for transmitting the device-related information on the common DL channel to the wireless device or the group of wireless devices, wherein the one or more transport block formats require a number of repeated transmissions of the device-related information on the common DL channel to meet a current coverage class of the wireless device or a coverage class common to the group of wireless devices; and,
determining the current coverage class to be used by the wireless device based on estimating the number of repeated transmissions to satisfy a target Block Error Rate (BLER) and considering a number of Hybrid Automatic Repeat Request (HARQ) retransmissions that will on average result from satisfying the target BLER.

8. The method of claim 7, further comprising:
transmitting a message including the device-related information to the wireless device or the group of wireless devices utilizing one of the one or more transport block formats.

9. The method of claim 7, wherein a plurality of transport block formats is determined to be utilized for transmitting the device-related information on the common DL channel to the group of wireless devices, and the method further comprises:
identifying common information included in the device-related information applicable to the group of wireless devices, and transmitting a message including the common information to the group of wireless devices utilizing one of the plurality of transport block formats that is decodable by the group of wireless devices; and,
identifying device-specific information included in the device-related information applicable to each individual wireless device in the group of wireless devices, and transmitting individual messages including the device-specific information to the respective individual wireless devices utilizing more than one of the plurality of transport block formats that are applicable to the respective individual wireless devices.

10. The method of claim 9, wherein the one of the plurality of transport block formats utilized to transmit the message including the common information to the group of wireless devices is the same as at least one of the more than one of the plurality of transport block formats utilized to transmit the individual messages including the device-specific information to the respective individual wireless devices.

11. The method of claim 9, wherein before transmitting the message including the common information and the individual messages including the device-specific information, the method further comprises:
adding information in the message including the common information and in each of the individual messages including the device-specific information, wherein the added information enables each of the individual wireless devices to uniquely identify the message including the common information that corresponds to its respective individual including containing the device-specific information.

12. The method of claim 7, wherein the current coverage class of the wireless device or the coverage class common to the group of wireless devices determines the number of repeated transmissions of the device-related information on the common DL channel.

13. A wireless device configured to improve a bandwidth utilization efficiency on a common downlink (DL) channel when receiving device-related information from a wireless access node, the wireless device comprising:
a processor; and,
a memory that stores processor-executable instructions, wherein the processor interfaces with the memory to execute the processor-executable instructions, whereby the wireless device is operable to receive one or more messages including the device-related information on the common DL channel from the wireless access node, wherein the one or more messages being received a repeated number of times on the common DL channel as required by one or more transport block formats defined to meet a current coverage class of the wireless device, and wherein the current coverage class of the wireless device is based on estimating the repeated number of times the wireless device is required to receive the one or more messages to satisfy a target Block Error Rate (BLER) and considering a number of Hybrid Automatic Repeat Request (HARQ) retransmissions that will on average result from satisfying the target BLER.

14. The wireless device of claim 13, wherein the wireless device is further operable to:
receive the device-related information included in one of the one or more messages having one of the one or more transport block formats.

15. The wireless device of claim 13, wherein a plurality of messages including the device-related information is received, wherein the plurality of messages has a plurality of transport block formats, wherein the device-related information includes (1) common information applicable to the wireless device and one or more other wireless devices, and (2) device-specific information applicable to the wireless device, and wherein the wireless device is further operable to:
receive the common information included in one of the plurality of messages having one of the plurality of transport block formats; and
receive the device-specific information included in another one of the plurality of messages having one of the plurality of transport block formats.

16. The wireless device of claim 15, wherein the one of the plurality of transport block formats utilized to transmit the one of the plurality of messages including the common information is the same as the one of the plurality of transport block formats utilized to transmit the one of the plurality of messages including the device-specific information.

17. The wireless device of claim 15, wherein the wireless device is further operable to:
identify information in the one of the plurality of messages including the common information and the one of the plurality of messages including the device-specific information, where the identified information uniquely identifies the one of the plurality of messages including the common information that corresponds to the one of the plurality of messages including the device-specific information.

18. The wireless device of claim 13, wherein the current coverage class of the wireless device determines a number of repeated transmissions of the device-related information on the common DL channel.

19. A method in a wireless device for improving a bandwidth utilization efficiency on a common downlink (DL) channel when receiving device-related information from a wireless access node, the method comprising:
receiving one or more messages including the device-related information on the common DL channel from the wireless access node, wherein the one or more messages being received a repeated number of times on the common DL channel as required by one or more transport block formats defined to meet a current coverage class of the wireless device, and wherein the current coverage class of the wireless device is based on estimating the repeated number of times the wireless device is required to receive the one or more messages to satisfy a target Block Error Rate (BLER) and considering a number of Hybrid Automatic Repeat Request (HARQ) retransmissions that will on average result from satisfying the target BLER.

20. The method of claim 19, further comprising:
receiving the device-related information included in one of the one or more messages having one of the one or more transport block formats.

21. The method of claim 19, wherein a plurality of messages including the device-related information is received, wherein the plurality of messages has a plurality of transport block formats, wherein the device-related information includes (1) common information applicable to the wireless device and one or more other wireless devices, and (2) device-specific information applicable to the wireless device, and the method further comprises:
receiving the common information included in one of the plurality of messages having one of the plurality of transport block formats; and
receiving the device-specific information included in another one of the plurality of messages having one of the plurality of transport block formats.

22. The method of claim 21, wherein the one of the plurality of transport block formats utilized to transmit the one of the plurality of messages including the common information is the same as the one of the plurality of transport block formats utilized to transmit the one of the plurality of messages including the device-specific information.

23. The method of claim 21, further comprising:
identifying information in the one of the plurality of messages including the common information and the one of the plurality of messages including the device-specific information, where the identified information uniquely identifies the one of the plurality of messages including the common information that corresponds to the one of the plurality of messages including the device-specific information.

24. The method of claim 19, wherein the current coverage class of the wireless device determines a number of repeated transmissions of the device-related information on the common DL channel.

* * * * *